United States Patent Office 3,461,207
Patented Aug. 12, 1969

3,461,207
16α - CHLORO-1,4-PREGNADIENE COMPOSITIONS AND PROCESS FOR TREATING INFLAMMATORY CONDITIONS
Robert D. Birkenmeyer, Comstock Township, Kalamazoo County, and Fred Kagan, Barney J. Magerlein, and William P. Schneider, Kalamazoo, Mich., assignors to The Upjohn Company, Kalamazoo, Mich., a corporation of Delaware
No Drawing. Continuation-in-part of application Ser. No. 202,403, June 14, 1962. This application Aug. 6, 1965, Ser. No. 477,967
The portion of the term of the patent subsequent to June 16, 1981, has been disclaimed
Int. Cl. A61k 17/06
U.S. Cl. 424—243                6 Claims

ABSTRACT OF THE DISCLOSURE

16α-chloro-1,4-pregnadiene compounds prepared in solid and liquid unit dosage form for oral, topical, and parenteral administration and process for the treatment of inflammatory conditions.

---

This application is a continuation-in-part of the pending application of R. D. Birkenmeyer et al., Ser. No. 202,403, now abandoned, filed in the U.S. Patent Office on June 14, 1962, which, in turn, is a continuation-in-part of application, Ser. No. 144,830 filed on Oct. 13, 1961 (now U.S. Patent 3,137,712, patented June 16, 1964).

This invention relates to novel therapeutic compositions and a process for treatment and more particularly to therapeutic compositions comprising a 16α-chloroprednisolone derivative in association with a pharmaceutical carrier and a process for treating inflammatory conditions by the administration of said compositions.

The novel compositions of the present invention comprise as the principal active ingredient a compound of the formula:

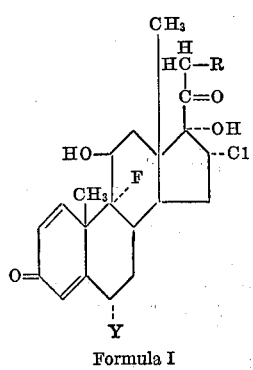

Formula I wherein R is a member selected from the group consisting of hydroxy, acyloxy, in which the acyl radical is that of an organic carboxylic acid containing from one to 12 carbon atoms, inclusive, salts of a pharmacologically acceptable anion and an acid ester of a dicarboxylic acid and —$OPO_3H_2$ and Y is a member selected from the group consisting of hydrogen and a fluorine, the said principal active ingredients either singly or in combination being dispersed in a pharmaceutical carrier.

The principal active ingredients of the preceding formula can be prepared in accordance with the procedures disclosed in U.S. Patent 3,137,712 (June 16, 1964).

The compositions of the present invention are useful in the treatment of human and animal subjects for various pathological conditions. The compositions provide a means for administration of the therapeutic ingredient to the subject by the oral and parenteral routes for systemic treatment as well as topical or localized treatment. The invention provides a method for the treatment of conditions such as rheumatoid arthritis, rheumatic fever, various dermatoses, eye and ear inflammations, joint (intraarticular) inflammation and adrenal hyperplasia. The compositions are advantageous for treating said conditions for reason of the improved ratio of therapeutic activity to undesirable side-effects, e.g., gastro-intestinal disturbances, salt retention, edema, etc., known to exist with similar known therapeutically active steroids.

The compositions of the present invention are preferably presented for administration in unit dosage forms such as tablets, capsules, powders, granules, sterile parenteral solutions or suspensions, oral solutions or suspensions, topical ointments, creams, lotions and the like.

For oral administration either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, starch, lactose, acacia, and functionally similar materials as pharmaceutical diluents or carriers. The tablets can be laminated or otherwise compounded to provide a dosage form affording the advantage of prolonged or delayed action or predetermined successive action of the enclosed medication. For example, the tablet can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixture of polymeric acids with such materials as shellac, cetyl alcohol, cellulose acetate and the like. Alternatively, the two component system can be utilized for preparing tablets containing two or more incompatible active ingredients. Capsules, like tablets, are prepared by mixing the steroid with an inert pharmaceutical diluent and filling the mixture into a hard gelatin capsule of appropriate size. Soft gelatin capsules are prepared by machine encapsulation after preparing a slurry of the steroid with corn oil or other inert oil.

Fluid unit dosage forms for oral administration such as syrups, elixirs, and suspensions can be prepared. The water-soluble forms can be dissolved in an equeous vehicle together with sugar, flavoring agents and preservatives to form a syrup. An elixir is prepared by using a hydro-alcoholic (ethanol) vehicle with suitable sweeteners such as sugar, saccharin, and cyclamate together with a flavoring agent. Suspensions can be prepared of the insoluble forms with a syrup vehicle with the aid of a suspending agent such as acacia, tragacanth, methylcellulose and the like.

Topical ointments can be prepared by dispersing the steroid in a suitable ointment base such as petrolatum, lanolin, polyethylene glycols, mixtures thereof, and the like. Advantageously the steroid is finely divided by means of a colloid mill utilizing light liquid petrolatum as a levigating agent. Creams and lotions are similarly prepared by dispersing the steroid in the oil phase of the system.

For parenteral administration, fluid unit dosage forms are prepared utilizing the steroid and a sterile vehicle, water being preferred. The steroid, depending on the form and concentration used, can be either suspended or dissolved in the vehicle. In preparing solutions the water-soluble steroid can be dissolved in water for injection and filter sterilized before filling into a suitable vial or ampule and sealing. Advantageously adjuvants such as a local anesthetic, preservative and buffering agents can be dissolved in the vehicle. To enhance the stability, the composition can be frozen after filling into the vial and the water removed under vacuum: the dry lyophilized powder is then sealed in the vial and an accompanying vial of water for injection is supplied to reconstitute the powder prior to use. Parenteral suspensions are prepared in substantially the same manner except that the steroid is suspended in the vehicle instead of being dissolved and sterilization cannot be accomplished by filtration. The steroid can be sterilized by exposure to ethylene oxide before suspending in the sterile vehicle. Advantageously, a surfactant or wetting agent is included in the composition to facilitate uniform distribution of the steroid.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, pills, powder packets, granules, wafers, cachets, teaspoonfuls, tablespoonfuls, dropperfuls, ampules, vials, segregated multiples of any of the foregoing, and other forms as herein described.

In addition to the administration of a compound of the Formula I as the principal active ingredient of compositions for the treatment of the conditions described herein, the said compound of the novel compositions can be included with other types of compounds to obtain advantageous combinations of properties. Such combinations include a compound of the Formula I with antibiotics such as chloramphenicol, penicillin, tetracyclines, erythromycin, novobiocin, neomycin, polymyxin and bacitracin; analgesics such as aspirin, sodium salicylate, N-acetyl-p-aminophenol and salicylamide; agents which lessen pain by means of altering the subjects attitude such as the amphetamines and tranquilizers; local anesthetics such as benzocaine, procaine, and tetracaine; antacids such as calcium carbonate, aluminum hydroxide, basic aluminum carbonate, and bismuth subcarbonate; and the vitamins, especially ascorbic acid and the vitamin B-complex.

The dosage of the compound of the Formula I for treatment depends on route of administration, age, weight, and condition of the patient. A dosage schedule of from about 0.5 to about 10 milligrams, one to four times daily, embraces the effective range for the treatment of most conditions for which the compounds are effective. The compound of the Formula I is compounded with suitable pharmaceutical carriers for convenient and effective administration. In the preferred embodiment of this invention the dosage units contain the steroid in 0.50, 1, 3 and 10 milligram amounts for systemic treatment and in 0.05, 0.1, 1 and 5% w./w. concentrations for topical or localized treatment. The dosage of compositions containing the steroid and one or more other active ingredients is to be determined with reference to the usual dosage of each such ingredient.

The following examples are illustrative of the best mode contemplated by the inventors for carrying out their invention and are not to be construed as limiting.

EXAMPLE 1

10,000 tablets, each containing 10 milligrams of $9\alpha$-fluoro-$16\alpha$-chloroprednisolone, are prepared from the following types and amounts of ingredients:

| | Gm. |
|---|---|
| $9\alpha$-fluoro-$16\alpha$-chloroprednisolone | 100 |
| Lactose | 1000 |
| Starch paste (10% w./v. starch in water | 100 |
| Starch | 32.5 |
| Calcium stearate | 6.5 |

The steroid and lactose are mixed together until the steroid is uniformly dispersed and then a granulation prepared by the addition of the starch paste. The granules are dried at 120° F. for 20 hours and the dried granules forced through a No. 16 screen. The granules are lubricated by the addition of the starch and calcium stearate and compressed into tablets, each tablet containing 10 milligrams of steroid.

The tablets so prepared are useful in the treatment of rheumatoid arthritis by the oral administration of 1 tablet 3 times a day.

Following the procedure of the preceding example, tablets containing 1 and 3 milligrams of $9\alpha$-fluoro-$16\alpha$-chloroprednisolone are prepared by reducing the amount of $9\alpha$-fluoro-$16\alpha$-chloroprednisolone from 100 grams to 10 grams and 30 grams respectively.

EXAMPLE 2

10,000 tablets, each containing 0.5 milligram of $9\alpha$-fluoro-$16\alpha$-chloroprednisolone and 325 milligrams (5 grains) of acetylsalicyclic acid as therapeutic ingredients, are prepared from the following types and amounts of ingredients:

| | Gm. |
|---|---|
| $9\alpha$-fluoro-$16\alpha$-chloroprednisolone | 5 |
| Acetylsalicyclic acid | 3250 |
| Starch | 200 |
| Magnesium stearate | 50 |

The steroid, aspirin, and starch are mixed together until uniformly dispersed. The mixture is thent slugged and the slugs broken into granules. The magnesium stearate is added to the granules and the mixture compressed into tablets.

The tablets so prepared are useful in the treatment of rheumatoid arthritis by the oral administration of 1 tablet 3 times a day.

Following the procedure of the preceding example, tablets containing 1.5 milligrams of $9\alpha$-fluoro-$16\alpha$-chloroprednisolone in addition to the 5 grains of aspirin are prepared by increasing the amount of $9\alpha$-fluoro-$16\alpha$-chloroprednisolone from 5 grams to 15 grams.

EXAMPLE 3

1000 two-piece hard gelatin capsules, each capsule containing 0.75 milligram of $9\alpha$-fluoro-$16\alpha$-chloroprednisolone, are prepared from the following types and amounts of ingredients.

| | |
|---|---|
| $9\alpha$-fluoro-$16\alpha$-chloroprednisolone gm | 0.75 |
| Corn starch gm | 150 |
| Magnesium stearate gm | 25 |
| Hard gelatin capsules | 1000 |

The finely powdered ingredients are mixed thoroughly until uniformly dispersed and then filled into hard gelatin capsules of appropriate size.

The capsules so prepared are useful in the treatment of rheumatic fever at a dose of 1 capsule twice a day.

Following the procedure of the preceding example, capsules containing 3 milligrams of $9\alpha$-fluoro-$16\alpha$-chloroprednisolone are prepared by increasing the amount of steroid to 3 grams.

EXAMPLE 4

1000 grams of a topical ointment for application to the eye or ear containing 0.1% of $9\alpha$-fluoro-$16\alpha$-chloroprednisolone and 0.6% neomycin sulfate are prepared from the following types and amounts of ingredients:

| | Gm. |
|---|---|
| 9α-fluoro-16α-chloroprednisolone (micronized) | 1 |
| Neomycin sulfate (micronized) | 6 |
| Light liquid petrolatum | 250 |
| Wool fat | 200 |
| White petrolatum, Q.s. ad 1000. | |

The wool fat, white petrolatum and 200 grams of light liquid petrolatum are melted together and held at 110° F. The steroid and neomycin are mixed with the remaining light liquid petrolatum and passed through a colloid mill. After passing through the mill, the mixture is stirred into the melt. With continued stirring, the melt is allowed to cool until congealed.

The foregoing ointment is usefully applied to the eye and ear for local treatment of infection and inflammation.

Following the procedure of the preceding example, an ointment containing 1% of a 9α-fluoro-16α-chloropredmisolone is prepared by increasing the amount of steroid from 1 gram to 10 grams. Similarly the 9α-fluoro-16α-chloroprednisolone 21-acetate can be substituted for the free alcohol forms of the example.

EXAMPLE 5

1000 grams of a topical ointment containing 0.25% of 9α-fluoro-16α-chloroprednisolone is prepared from the following types and amounts of ingredients:

| | Gm. |
|---|---|
| 9α-fluoro-16α-chloroprednisolone (micronized) | 2.5 |
| Light liquid petrolatum | 100 |
| Wool fat | 200 |
| White petrolatum Q.s. ad 1000. | |

The wool fat, white petrolatum and one-half of the light liquid petrolatum are melted together and held at a temperature of 160° F. The steroid is added to the remaining light liquid petrolatum and passed through a colloid mill. After passing through the mill, the steroid is stirred into the melt. With continued stirring, the melt is allowed to cool until congealed.

The foregoing ointment is usefully applied to the skin for the treatment of allergic dermatoses and other inflammatory skin diseases.

Following the procedure of the preceding example, an ointment containing 5% of 9α-fluoro-16α-chloroprednisolone is prepared by increasing the amount of steroid from 1 gram to 50 grams. Similarly the 9α-fluoro-16α-chloroprednisolone 21-acetate can be substituted for the free alcohol form of the example.

EXAMPLE 6

1000 cc. of a sterile solution for parenteral administration containing 10 mg./cc. of 9α-fluoro-16α-chloroprednisolone 21-succinate sodium is prepared from the following types and amounts of ingredients:

| | Gm. |
|---|---|
| 9α-fluoro-16α-chloroprednisolone 21-succinate sodium | 10 |
| Sodium biphosphate, anhydrous | 0.8 |
| Sodium phosphate, exsiccated | 0.87 |
| Lactose | 50 |
| Water for injection, cc., Q.s. ad 1000. | |

The ingredients are dissolved in the water and the solution sterilized by filtration. The sterile solution is aseptically filled into sterile vials, 1 cc./vial, and frozen. The water is removed under high vacuum and the vials containing the lyophilized powder are sealed. Just prior to use, sufficient water for injection to make 1 cc. of solution is added to the vial.

The parenteral solution so prepared is useful in the treatment of rheumatic fever when administered parenterally (intramuscularly or intravenously) at a dose of 1 cc.

Following the procedure of the preceding example, a parenteral solution containing 2 or 30 milligrams of 9α-fluoro-16α-chloroprednisolone 21-succinate sodium is prepared by substituting the amount of steroid from 10 grams to 2 grams and 30 grams respectively.

EXAMPLE 7

1000 cc. of a solution for ophthalmic treatment containing 0.075% 9α-fluoro-16α-chloroprednisolone 21-succinate sodium and 6000 units/cc. of polymyxin B sulfate are prepared from the following types and amounts of ingredients:

| | Gm. |
|---|---|
| 9α-fluoro - 16α - chloroprednisolone 21 - succinate sodium | 0.75 |
| Polymyxin B sulfate (10,000 units/mg.) | 0.6 |
| Sodium citrate | 4.5 |
| Polyethylene glycol 4000 | 120 |
| Polyvinylpyrrolidone | 1 |
| Sodium hydroxide, Q.s. pH–7.4. | |
| Water for injection, cc. Q.s. ad 1000. | |

The ingredients are dissolved in the water and the pH adjusted to from pH 7 to 7.4 by the addition of sodium hydroxide. The solution is sterilized by filtration and aseptically filled into sterile 5 cc. dropper bottles.

The compositions so prepared are useful for the treatment of infection and inflammation in the eye by the administration to the eye of 1 to 5 drops 3 times a day.

EXAMPLE 8

1000 cc. of a sterile aqueous suspension for parenteral administration is prepared from the following types and amounts of ingredients:

| | Gm. |
|---|---|
| 9α-fluoro-16α-chloroprednisolone-21-acetate | 10 |
| Sodium citrate | 4.5 |
| Polyethylene glycol 4000 | 120 |
| Myristyl-γ-picolinium chloride | 0.2 |
| Polyvinylpyrrolidone | 1 |
| Deionized water cc., Q.s. 1000. | |

The soluble ingredients are dissolved in the water and the steroid suspended in the solution. The suspension is sterilized and filled into sterile 1 cc. vials.

The composition is useful in the treatment of rheumatic fever at a dose of 1 cc. administered intramuscularly.

EXAMPLE 9

Following the procedures of the preceding Examples 1 to 8, inclusive, compositions are similarly prepared substituting the equivalent form of 6α,9α-difluoro-16α-chloroprednisolone for the 9α-fluoro-16α-chloroprednisolone of the Example 1.

We claim:

1. A therapeutic composition in unit dosage form comprising from about 0.5 to about 10 mg. of a compound selected from the group consisting of compounds having the formula:

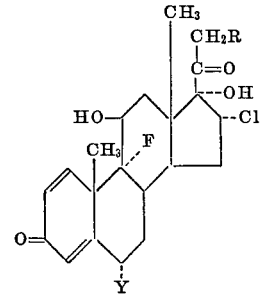

wherein R is a member selected from the group consisting of hydroxy, acyloxy wherein the acyl radical is that of an organic carboxylic acid of from 1 to 12 carbon atoms inclusive, salts of a pharmacologically acceptable anion and an acid ester of a dicarboxylic acid and —OPO₃H₂; and Y is a member selected from the group consisting of hydrogen and fluorine, in combination with a pharmaceutical carrier.

2. A solid therapeutic composition in unit dosage form comprising from about 0.5 to about 10 mg. of a compound selected from the group consisting of the compound having the formula:

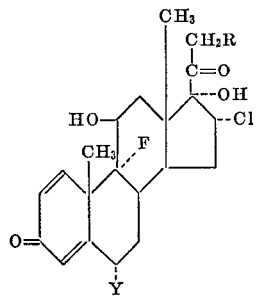

wherein R is a member selected from the group consisting of hydroxy, acyloxy wherein the acyl radical is that of an organic carboxylic acid of from 1 to 12 carbon atoms inclusive, salts of a pharmacologically acceptable anion and an acid ester of a dicarboxylic acid and —OPO₃H₂; and Y is a member selected from the group consisting of hydrogen and fluorine, in association with a solid pharmaceutical carrier.

3. A therapeutic composition for topical application comprising from about 0.05 to about 5% w./w. of a compound selected from the group consisting of the compound having the formula:

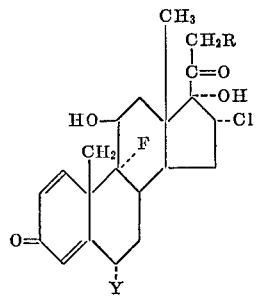

wherein R is a member selected from the group consisting of hydroxy, acyloxy wherein the acyl radical is that of an organic carboxylic acid of from 1 to 12 carbon atoms inclusive, salts of a pharmacologically acceptable anion and an acid ester of a dicarboxylic acid and —OPO₃H₂; and Y is a member selected from the group consisting of hydrogen and fluorine, in association with an ointment base.

4. An aqueous solution for parenteral administration comprising a member selected from the group consisting of 9α-fluoro-16α-chloroprednisolone-21-succinate and the salts thereof with a pharmacologically acceptable anion and 6α,9α - difluoro-16α-chloroprednisolone-21-succinate and the salts thereof with a pharmacologically acceptable anion, in association with a sterile aqueous parenteral vehicle.

5. A process for treating inflammatory conditions in human and animal subjects which comprises administering to a subject with an inflammatory condition a compound selected from the group of compounds having the formula:

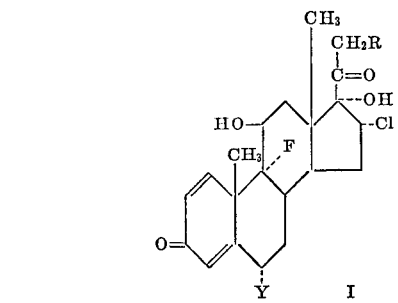

wherein R is a member selected from the group consisting of hydroxy, acyloxy wherein the acyl radical is that of an organic carboxylic acid of from 1 to 12 carbon atoms, inclusive, salts of a pharmacologically acceptable anion and an acid ester of a dicarboxylic acid, and —OPO₃H₂; and Y is a member selected from the group consisting of hydrogen and fluorine.

6. A process for treating inflammatory conditions in human and animal subjects which comprises administering to a subject with an inflammatory condition a compound selected from the group of compounds having the formula:

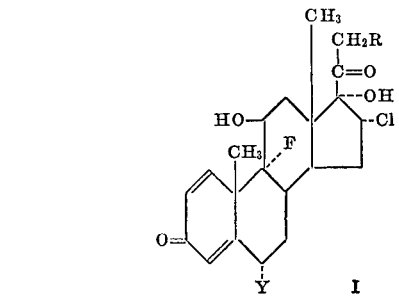

wherein R is a member selected from the group consisting of hydroxy, acyloxy wherein the acyl radical is that of an organic carboxylic acid of from 1 to 12 carbon atoms, inclusive, salts of a pharmacologically acceptable anion and an acid ester of a dicarboxylic acid, and —OPO₃H₂; and Y is a member selected from the group consisting of hydrogen and fluorine in association with a pharmaceutical carrier.

References Cited

UNITED STATES PATENTS 3,137,712   10/1961   Birkenmeyer et al. _ 260—397.45

ALBERT T. MEYERS, Primary Examiner

STANLEY J. FRIEDMAN, Assistant Examiner

U.S. Cl. X.R.

424—224